United States Patent

[11] 3,547,241

| [72] | Inventor | William H. Tungate<br>Battle Creek, Mich. |
|---|---|---|
| [21] | Appl. No. | 820,525 |
| [22] | Filed | April 30, 1969 |
| [45] | Patented | Dec. 15, 1970 |
| [73] | Assignee | American Fire Pump Company<br>Battle Creek, Mich.<br>a corporation of Michigan |

[54] POSITIVE CLUTCH WITH FRICTION SYNCHRONIZING MEANS
6 Claims, 5 Drawing Figs.

| [52] | U.S. Cl. | 192/53 |
|---|---|---|
| [51] | Int. Cl. | F16d 23/04 |
| [50] | Field of Search | 192/53, 53(.2), 53(.6) |

[56] References Cited
UNITED STATES PATENTS

| 745,848 | 12/1903 | Hopkins | 192/53(.2)(UX) |
|---|---|---|---|
| 776,404 | 11/1904 | Keyser | 192/53(.2) |
| 1,368,888 | 2/1921 | Brown | 192/53(.2) |
| 1,712,190 | 5/1929 | Yates | 192/53(.2) |
| 1,755,769 | 4/1930 | Carhart | 192/53(.2) |
| 2,130,895 | 9/1938 | Ness | 192/53(.2)(X) |
| 2,554,740 | 5/1951 | Tellis et al. | 192/53(.2)(X) |

*Primary Examiner*—Allan D. Herrmann
*Attorney*—Woodhams, Blanchard and Flynn

ABSTRACT: An improved clutch structure for permitting a driven member to be clutchably engaged to a high-speed driving member. The clutch structure includes both a friction clutch for bringing the driven member up to speed and a positive jaw clutch for positively driving the driven member after same has reached the speed of the driving member. The clutch structure includes first and second actuating means connected to the friction and jaw clutches, respectively, which actuating means are moved by a common control member for permitting independent and successive operation of the friction and positive jaw clutches.

PATENTED DEC 15 1970

INVENTOR.
WILLIAM H. TUNGATE
BY
Woodhams, Blanchard & Flynn
ATTORNEYS

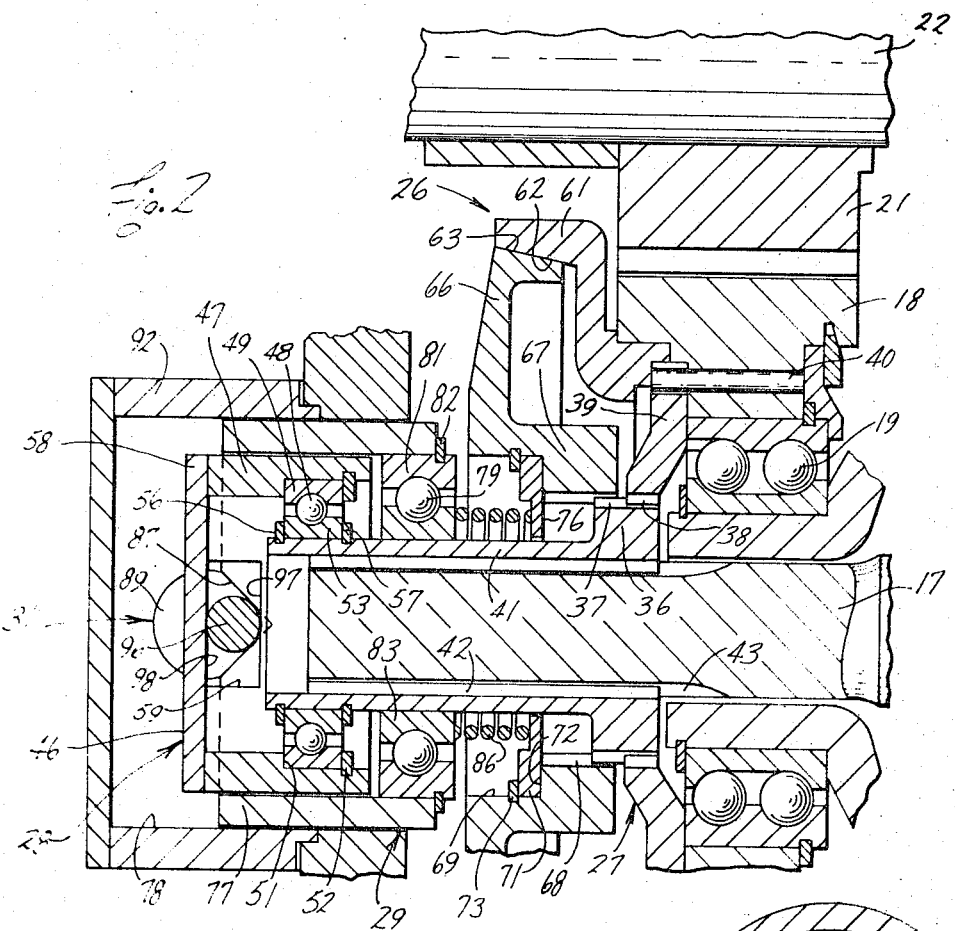
Fig. 2
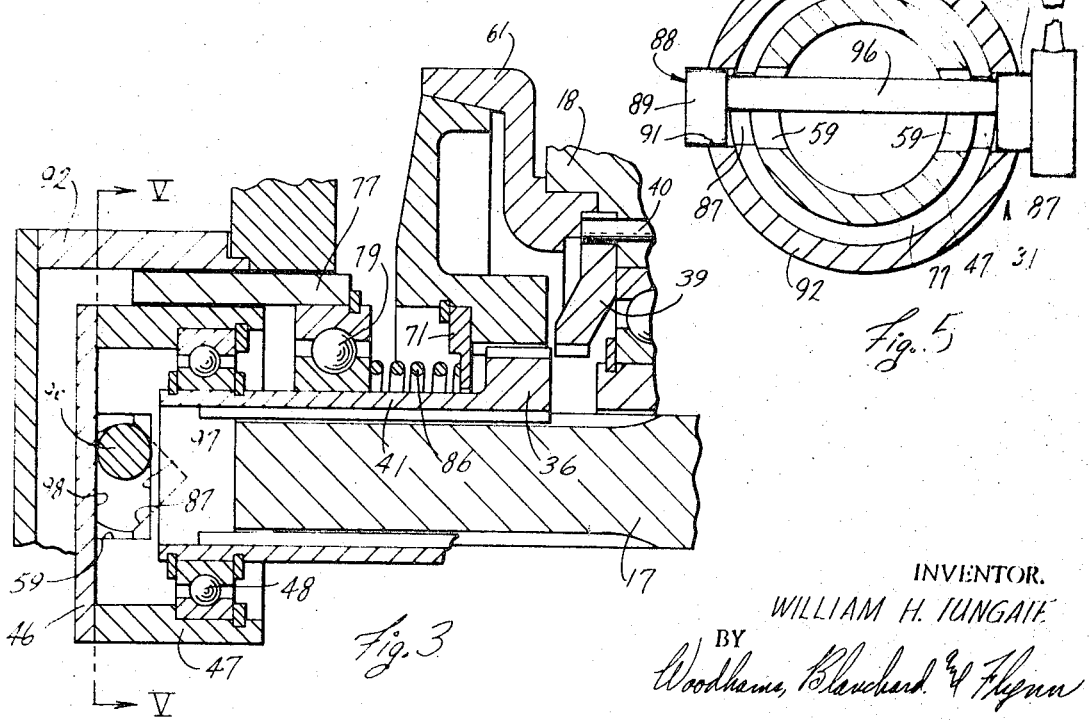
Fig. 3
Fig. 5
INVENTOR.
WILLIAM H. IUNGATE 3,547,241

1

POSITIVE CLUTCH WITH FRICTION SYNCHRONIZING MEANS

FIELD OF THE INVENTION

This invention relates to an improved clutch and synchronizer structure and, in particular, to a structure adaptable for driving the water pump of a fire engine and which includes both frictional and positive clutch means which are independently and successively operated for permitting synchronization between driving and driven members.

BACKGROUND OF THE INVENTION

Numerous clutch structures are known which are provided with both friction and positive clutch means which are progressively actuated so that the friction clutch is initially actuated to provide speed synchronization between the driving and driven members before the positive clutch means is engaged. One such clutch structure particularly adapted for driving the water pump of a fire engine and employing a friction clutch for synchronization is disclosed in U.S. Pat. No. 2,246,774, issued to Adney. The clutch structure disclosed in Adney includes a friction clutch and a conventional jaw clutch, both of which are interconnected to a single manually actuated control handle by means of a common actuating mechanism. While the Adney structure operates in a satisfactory manner, the use of a single actuating mechanism for interconnecting and successively actuating both the friction and jaw clutches does not always result in the most efficient clutch operation. Specifically, the single actuating mechanism causes actuation of the friction and jaw clutches to be dependent upon one another, and thus the most desirable friction clutch actuation is often not achieved so that the driving member often does not attain a synchronous speed in as short a time as possible.

It has further been discovered that during disengagement of the clutch structure disclosed in the Adney patent, the retraction of the positive jaw clutch is often accompanied by a sufficient simultaneous, reduction in the spring pressure exerted on the friction clutch that an undesirable load may be imposed onto the corners of the jaw clutch teeth at the instant of disengagement. This results in excessive wear of the jaw clutch teeth.

Accordingly, it is an object of this invention:
1. To provide an improved clutch and synchronizer structure, particularly for the water pump in a fire engine, having a friction and a positive clutch means which are successively and independently operated.
2. To provide a structure, as aforesaid, which insures positive engagement of the friction clutch means to achieve synchronization between the driving and driven members prior to engagement of the positive clutch means.
3. To provide a structure, as aforesaid, which includes first and second actuating mechanisms which are independently movable and are connected to the friction and positive clutch means, respectively, for permitting successive but independent actuation thereof.
4. To provide a structure, as aforesaid, which includes a single manually actuated control element for permitting simultaneous control of both the first and second actuating mechanisms.
5. To provide a structure, as aforesaid, wherein the control element cooperates with the first and second actuating mechanisms for providing a detent mechanism to positively maintain the clutch and synchronizer structure in either the engaged or disengaged position.
6. To provide a structure, as aforesaid, which results in a more efficient and positive speed synchronization between the driving and driven members prior to engagement of the positive clutch means.
7. To provide an improved clutch and synchronizer structure, as aforesaid, which is more dependable and efficient in operation.

2

Other objects and purposes of this invention will be apparent to persons acquainted with devices of this type upon reading the following specification and inspecting the accompanying drawings.

BRIEF DESCRIPTION OF THE DRAWINGS

FIG. 2 is an enlarged sectional view of the clutch and synchronizer structure illustrated in FIG. 1, the friction and positive clutches both being illustrated in the engaged position.

FIG. 3 is a broken sectional view similar to FIG. 2 and illustrating an intermediate position wherein the friction clutch is engaged and the positive clutch is disengaged.

FIG. 4 is a broken sectional view similar to FIGS. 2 and 3 but showing both the friction and positive clutch in the disengaged position.

FIG. 5 is a sectional view taken substantially along the line V–V of FIG. 3.

Figure 1:
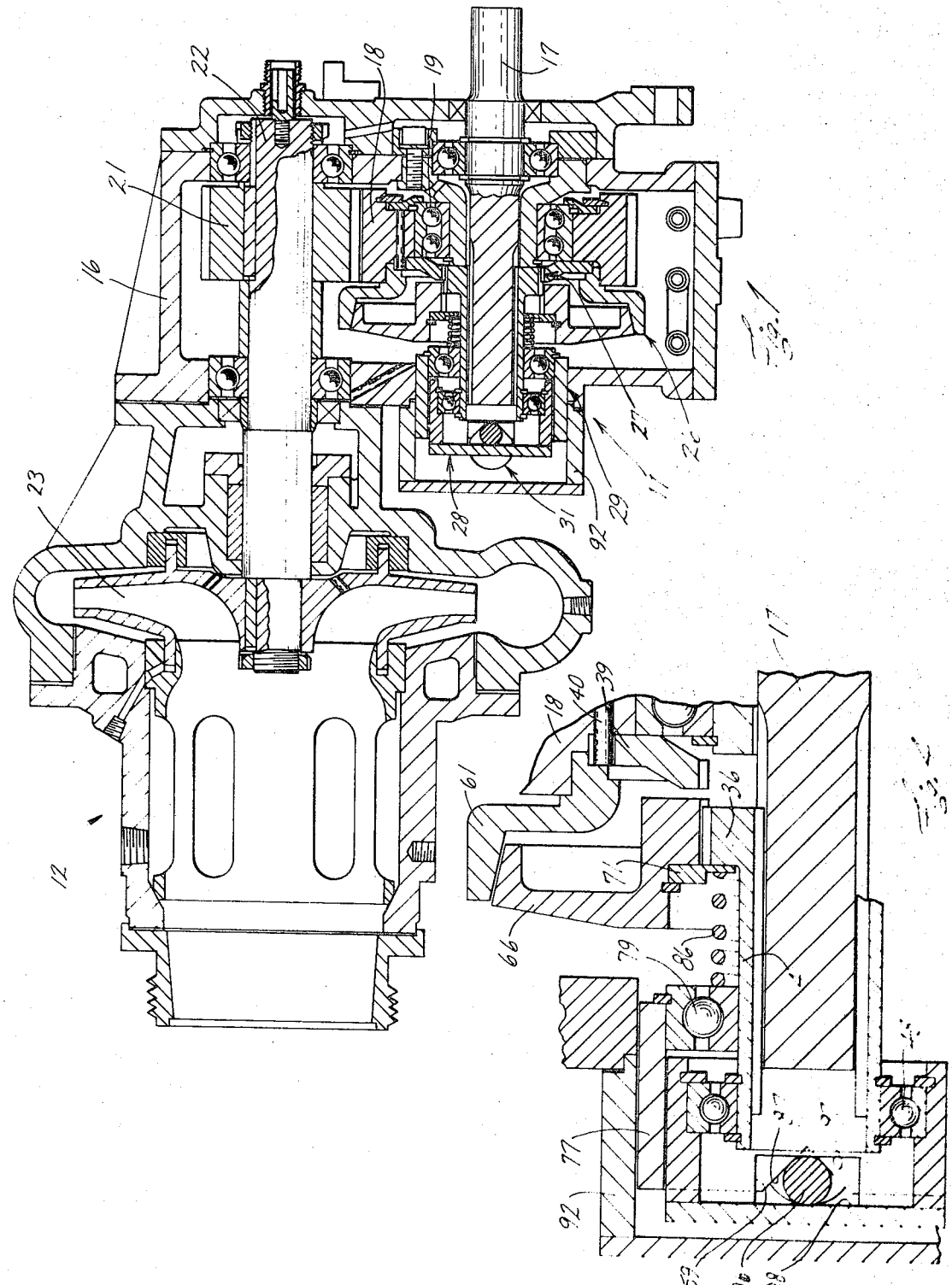
FIG. 1 is a sectional view of a centrifugal water pump structure incorporating the improved clutch and synchronizer structure thereon according to the present invention.

Certain terminology will be used in the following description for convenience in reference only and will not be limiting. The words "upwardly", "downwardly", "rightwardly" and "leftwardly" will designate directions in the drawings to which reference is made. The word "forwardly" will refer to the direction of movement of the actuating mechanisms for causing clutch engagement (rightwardly in FIG. 2), whereas the word "rearwardly" will refer to the opposite direction of movement so as to cause clutch disengagement. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of this invention are met by providing an improved clutch and synchronizer structure adapted primarily for driving the water pump of a fire engine and having both a friction clutch and a positive clutch for interconnecting driving and driven members. The driven member includes both a friction clutch element and a jaw clutch element fixedly secured thereto and engageable by cooperating friction and jaw clutch elements, respectively, which are nonrotatably secured to the driving member. The jaw clutch element on the driving member is movable axially thereof by means of a manual control element for permitting same to be moved between engaged and disengaged positions. The friction clutch element nonrotatably secured to the driving member is resiliently urged in a direction toward its engaged position and is mounted for free axial movement relative to both the driving member and the driving jaw clutch element, its axial movement also being controlled by the manual control element. The movements of the driving friction and jaw clutch elements are thus independently controlled for assuring full load carrying engagement of the friction clutch prior to any engagement of the jaw clutch.

DETAILED DESCRIPTION

The present invention, as illustrated in FIG. 1, relates to an improved clutch and synchronizer structure, indicated generally at 11, for driving a centrifugal water pump, indicated generally at 12. The clutch and synchronizer structure 11 and the pump 12 are mounted within a housing 16 which rotatably supports therein an input or driving shaft 17 having a driven member in the form of a gear 18 rotatably supported thereon by means of a bearing 19. The driven gear 18 is in meshing engagement with the further gear 21 which is nonrotatably secured to a driven shaft 22, on the end of which is nonrotatably secured a pump rotor 23.

The driving shaft 17 is rotatably driven from a conventional power source (not shown), such as the engine of a fire truck, and the gear 18, positively rotatable with the rotor shaft 22, is selectively clutchable to the driving shaft 17 when it is desired to operate the pump 12. To permit the rotor gear 18 to be selectively clutchable to the driving shaft 17, the clutch and synchronizer structure 11 includes therein a friction clutch 26 which is initially engaged to synchronize the speed of the driven gear 18 with the speed of the driving shaft 17, and a positive jaw clutch 27 which is engaged to provide for positive driving of the gear 18 and the rotor shaft 22 after the speed of gear 18 has been synchronized with the speed of the input shaft 17. The engagement and disengagement of the jaw clutch 27 is controlled by a first actuating mechanism 28, whereas the engagement and disengagement of the friction clutch 26 is controlled by a further actuating mechanism 29. The first and second actuating mechanisms 28 and 29 are both movable independently of one another but the movement of each is controlled by a common control device 31.

Considering first the construction of the jaw clutch 27, same includes a driving jaw clutch element 36 (FIG. 2) nonrotatably mounted relative to the driving shaft 17 and constructed in the form of a gear having external gear teeth 37 thereon adapted to meshingly engage similar internal gear teeth 38 formed on the driven jaw clutch element 39, which element then drives the driven gear member 18 through drive pins of which one appears at 40.

The jaw clutch 27 is controlled by the first actuating mechanism 28 which includes an elongated driving sleeve 41 having internal axial splines 42 formed thereon and in meshing engagement with corresponding external axial splines 43 formed on the periphery of the driving shaft 17. The driving sleeve 41 is thus nonrotatably secured relative to the driving shaft 17 but is mounted for axial movement relative thereto.

The driving sleeve 41 is fixedly, here integrally, connected to the jaw clutch gear 36 adjacent one end of the sleeve (rightward end in FIG. 2), the other end of the sleeve 41 (leftward end in FIG. 2) being secured in rotatable but axially fixed relationship to a retainer member 46. The retainer member 46 includes a sleeve portion 47 which is positioned in surrounding concentric relationship with the driving sleeve 41 and is rotatably supported thereon by means of a ball bearing assembly 48. The outer race 49 of the ball bearing 48 is fixedly secured to the sleeve 47 and is axially axially retained thereon between a shoulder 51 and a retainer ring 52. The inner race 53 of the ball bearing 48 is mounted on the external periphery of the driving sleeve 41 and is axially retained thereon by a pair of spaced retainer rings 56 and 57. The bearing assembly 48 thus permits relative rotation while preventing relative axial movement between the driving sleeve 41 and the surrounding sleeve portion 47.

The retainer member 46 further includes an annular end plate 58 fixedly secured to the rearward axial end of the sleeve portion 47. The sleeve portion 47 is also provided with a pair of elongated slots 59 extending radially through the sidewalls thereof, which slots 59 are positioned diametrically opposite each other for a purpose to be explained hereinafter.

Considering now the friction clutch 26, same comprises a driven friction clutch element 61 (FIG. 2) in the form of an annular sleeve fixedly secured to the driven gear 18. The driven friction clutch element 61 is provided with an internal conical friction surface 62 thereon which is adapted to be frictionally engaged by a similar external conical frictional surface 63 formed on the driving friction clutch element 66. The driving friction clutch element 66 has a hub portion 67, one axial end of which is provided with internal gear teeth 68 which are adapted to be maintained in continuous meshing engagement with the external gear teeth 37 formed on the driving jaw clutch element 36. The driving friction clutch element 66 is thus nonrotatably supported on the driving jaw clutch element 36.

The hub portion 67 is further provided with a recess 69 adjacent the rearward axial end thereof in which is positioned an abutment plate 71, the plate 71 being fixedly secured to the hub portion hub portion 67 by being retained between a hub shoulder 72 and a retainer ring 73. The abutment plate 71 is provided with an abutment surface 76 on the forward side thereof which is adapted to be contacted by the driving jaw clutch element 36 to permit disengagement of the friction clutch 26.

The engagement and disengagement of the friction clutch 26 is controlled by means of the second actuating mechanism 29, which actuating mechanism includes a control sleeve 77 slideably received within a housing bore 78, the control sleeve 77 being positioned in concentric surrounding relationship with the driving sleeve 41. The control sleeve 77 is rotatably supported on the driving sleeve 41 by means of a ball bearing assembly 79 which has an outer race 81 supported within the control sleeve 77 and secured thereto by means of a retainer ring 82. The ball bearing assembly 79 has its inner race 83 freely supported on the external periphery of the driving sleeve 41 so as to permit relative axial movement therebetween.

The second actuating mechanism 29 further includes a compression spring 86 positioned in surrounding relationship with the driving sleeve 41 and having its opposite ends bearing against the abutment plate 71 and the inner bearing race 83 as illustrated in FIG. 2. The spring 86 thus normally biases the driving friction clutch element 66 in a forward clutch engaging direction, whereas the spring also tends to bias the ball bearing 79 and the control sleeve 77 in a rearward direction (leftwardly in FIG. 2). The control sleeve 77 is also provided with a pair of diametrically opposite, V-shaped notches 87 formed in the rearward axial end face thereof, which V-shaped notches 87 are positioned substantially adjacent to and at least partially overlie the elongated slots 59 formed within the sleeve portion 47. The slots 59 and notches 87 cooperate with the control device 31 for controlling the movement and position of the first and second actuating mechanisms 28 and 29, respectively.

The control device 31 specifically includes a control shaft 88 (FIG. 5) having a pair of spaced cylindrical bearing portions 89 which are rotatably received within a pair of spaced openings 91 which extend through the walls of the cylindrical housing portion 92. One of the cylindrical bearing portions 89 extends outwardly beyond the cylindrical housing portion 92 and is provided with an elongated control handle or lever 93 fixedly secured thereto for permitting manual manipulation and rotation of the control shaft 88. The control shaft 88 is further provided with an eccentric pin or crank 96 fixedly secured to and extending between the bearing portions 89. The eccentric pin 96 extends through the elongated slots 59 and has a diameter substantially equal to or slightly less than the depth of the slots 59 so that the pin is rather tightly confined within the slots 59 in the axial direction of the driving shaft 17. The eccentric pin 96 is adapted to contact opposite abutment surfaces 97 and 98 as defined by the opposite edges of the slots 59 for controlling the axial movement of the retainer member 46 and the driving sleeve 41. The eccentric pin 96 is also adapted to be positioned within and extend through the V-shaped notches 87 formed in the control sleeve 77 when the eccentric pin 96 is positioned in its alternate extreme positions as illustrated in FIGS. 2 and 4.

OPERATION

The operation of the device embodying the invention will be described in detail hereinbelow for a better understanding thereof.

Assuming that the device is in the position illustrated in FIGS. 1 and 2, the friction clutch 26 and the jaw clutch 27 are in positive driving engagement such that the driven gear member 18 is rotating at the same speed as the input shaft 17. When in the position of FIG. 2, the eccentric pin 96 is in its forwardmost position (which might be referred to as the 3 0'-clock position) such that the pin is positioned within the V- shaped notches 87. The spring 86 urges the ball bearing 79 and the control sleeve 77 rearwardly (leftwardly in FIG. 2) such that the eccentric pin 96 extends into the notches 87, the spring-biased control sleeve 77 thus functioning as a detent or holding device for maintaining the eccentric pin 96 in the advanced position wherein both the friction clutch 26 and jaw clutch 27 are in driving engagement.

When it is desired to disengage the clutch and synchronizing structure 11, the control handle 93 will be manually rotated through an angle of approximately 90° whereby the eccentric pin 96 will be moved to the position substantially as illustrated in FIG. 3. This rotation of the control handle 93 causes the pin 96 to abut the sidewalls of the V-shaped notches 87 whereby the control sleeve 77 is moved slightly forwardly (rightwardly in FIG. 2) against the opposition of spring 86, thereby releasing the pin 96 and permitting same to be rotated into the intermediate position illustrated in FIG. 3 (which position might be designated the 12 0'clock position).

As illustrated in FIG. 3, the pin 96 is still in contact with the V-shaped notches 87 but is in contact therewith adjacent the upper edges of the sidewalls thereof, rather than being in contact adjacent the base thereof as when the pin is in its extreme forwardmost position as illustrated in FIG. 2. The pin 96, when positioned as illustrated in FIG. 3, thus maintains the control sleeve 77 in substantially the same position as illustrated in FIG. 2, whereupon the compression of spring 86 is substantially the same and thus the spring 86 maintains the driving friction clutch element 66 in driving frictional engagement with the driven friction clutch element 61.

However, since the eccentric pin 96 is snugly confined within the elongated slots 59, movement of the pin 96 from its forwardmost position of FIG. 2 to the intermediate position of FIG. 3 causes the retainer member 46 to be moved rearwardly (leftwardly in FIG. 2). This in turn causes the driving sleeve 41 to also move rearwardly whereupon the teeth 37 of the driving jaw clutch element 36 are moved out of meshing engagement with the teeth 38 of the driven jaw clutch element 39 substantially as illustrated in FIG. 3. Thus, in this intermediate position (FIG. 3), the positive jaw clutch 27 has been disengaged whereas the friction clutch 26 is still in driving engagement.

Continued rotational movement of the control handle 93 through a further angle of approximately 90° causes the eccentric pin 96 to assume its opposite extreme position substantially as illustrated in FIG. 4 (approximately a 9 o'clock position). Movement of the eccentric pin 96 from the intermediate position of FIG. 3 to the rearward extreme position of FIG. 4 causes the retainer member 46 and the driving sleeve member 41 to be further moved rearwardly (leftwardly in FIG. 3), whereupon the driving jaw clutch element 36 contacts the forward abutment surface 76 and causes the driving friction clutch element 66 to be axially moved rearwardly (leftwardly in FIG. 3) in opposition to the urging of spring 86. The driving friction clutch element 66 is thus moved out of engagement with the driving friction clutch element 61, thereby completely interrupting the transmission of drive torque from the driving shaft 17 to the driven gear 18.

The rearward movement of the eccentric pin 96 from the intermediate position of FIG. 3 to the rearward extreme position of FIG. 4 also simultaneously tends to cause the pin 96 to move away from the rearward axial end face of the control sleeve 77. However, since the compression spring 86 continuously urges the control sleeve 77 rearwardly (leftwardly in FIGS. 3 and 4), the control sleeve 77 will follow the rearward movement of the pin 96 such that, when the pin 96 assumes its rearward extreme position as illustrated in FIG. 4, the eccentric pin 96 will again be positioned within the V-shaped notches 87 and in contact therewith adjacent the lower portions thereof. The control sleeve 77, under the urging of the spring 86, thus again substantially functions as the holding or detent mechanism for maintaining the eccentric pin 96 in its released or rearward extreme position thereby normally preventing accidental movement of the control handle 93 so as to prevent accidental clutch engagement.

When it is desired to again the actuate the clutch structure so as to rotatably drive the rotor shaft 22, then the control handle 93 will be manually rotated through an angle of approximately 90° whereupon the eccentric pin 96 will move from the position of FIG. 4 to the position of FIG. 3. This initial rotation of the pin will cause the control sleeve 77 to be cammed forwardly (rightwardly in FIG. 4) in opposition to the spring 86 to permit the pin 96 to be released. The forward rotational movement of the eccentric pin 96 will also cause the retainer member 46 and the driving sleeve 41 to be moved forwardly (rightwardly in FIG. 4), which in turn will move the driving jaw element 36 forwardly such that the spring 86 is again permitted to resiliently urge the driving friction element 66 into frictional engagement with the driven friction element 61. The engagement of the friction clutch 26 will thus cause the speed of the driven gear 18 to be increased so as to be substantially synchronized with the rotational speed of the driving shaft 17. However, the jaw clutch 27 is still disengaged when the control pin 96 is in the intermediate position of FIG. 3.

After the desired synchronization between the driving and driven members has been achieved, the control handle 93 will again be rotated through a further angle of approximately 90° such that the eccentric pin 96 will move from the intermediate position of FIG. 3 into the extreme forward position of FIG. 2. As the eccentric pin 96 moves toward the position of FIG. 2, the pin will cause the retainer member 46 and the driving sleeve 41 to move further forwardly (rightwardly in FIG. 3) whereupon the external teeth 37 of the driving jaw clutch element 36 will meshingly engage the internal teeth 38 of the driven jaw clutch element 39 so as to positively drive the driven member 18.

The rotational movement of eccentric pin 96 from the intermediate position of FIG. 3 to the extreme forward position of FIG. 2 will also cause a slight forward movement of the control sleeve 77 against the urging of the spring 86 as the pin 96 is initially moved away from the intermediate position of FIG. 3. This inward movement of the control sleeve 77 is caused by the pin 96 contacting the sidewalls of the V-shaped notch 87 and causing a forward camming of the control sleeve 77. However, as the pin 96 approaches its extreme forward position adjacent the bottom of the V-shaped notches 87, as illustrated in FIG. 2, the spring 86 will again return the control sleeve 77 back to its original position (as illustrated in FIGS. 2 and 3) whereupon the control sleeve 77, under the urging of the spring 86, will thus function as a holding or detent device for preventing accidental displacement of the eccentric pin 96, which accidental displacement would in turn result in accidental disengagement of the clutch and synchronizer structure 11.

Although a particular preferred embodiment of the invention has been disclosed above for illustrative purposes, it will be understood that obvious and equivalent variations or modifications thereof which lie within the scope of the invention as described above are fully contemplated.

I claim:

1. An improved clutch and synchronizer structure, particularly for a water pump, comprising:
   housing means having a driving shaft and a driven member rotatably supported thereon;
   positive clutch means including driving and driven jaw clutch elements drivingly interconnected to said driving shaft and said driven member, respectively, for permitting positive driving of said driven member, said driving and driven jaw clutch elements being mounted for relative movement between engaged and disengaged positions;
   friction clutch means including driving and driven friction clutch elements drivingly interconnected to said driving shaft and said driven member, respectively, for permitting at least partial speed synchronization between said driving shaft and said driven member, said driving and driven friction clutch elements being mounted for relative movement between engaged and disengaged positions;

first actuating means moveably mounted on said housing means and interconnected to one of said jaw clutch elements for controlling the movement thereof between said engaged and disengaged positions;

second actuating means moveably mounted on said housing means and movable relative to said first actuating means and interconnected to one of said friction clutch elements for controlling the movement thereof between said engaged and disengaged positions; and control means interconnected to both said first and second actuating means for simultaneously controlling the movement thereof for permitting independent and successive operation of said friction clutch means and said positive clutch means as said friction and positive clutch means are moved from the disengaged to the engaged position.

2. A structure according to claim 1, further including holding means cooperating with said friction clutch means and said positive clutch means for normally maintaining same in either a completely engaged or a completely disengaged position.

3. A structure according to claim 1, wherein said driven member comprising a gearlike element concentric with and rotatable relative to said driving shaft;

said first actuating means includes a first sleeve means having a driving gear fixedly secured thereto with said first sleeve means being nonrotatably secured relative to said driving shaft, said first sleeve means being mounted for slideable axial movement on said driving shaft whereby said driving gear is movable from a first position in meshing engagement with the driven member to a second axially displaced position wherein said driving gear is out of mesh with said driven member;

said second actuating means including second sleeve means mounted for axial movement relative to said housing means and relative to said first sleeve means, and resilient means coacting between said second sleeve means and said one of said friction clutch elements; and said control means including an angularly movable, eccentric crank in driving engagement with said first and second sleeve means for controlling the axial position thereof.

4. A structure according to claim 3, wherein said driving and driven friction clutch elements are each concentric with said driving shaft, and said driven friction clutch element being fixedly interconnected to said driven jaw clutch element;

said driving friction clutch element and said driven jaw clutch element each having teeth thereon adapted to mesh with teeth formed on said driving gear, the teeth on said driving gear being in continuous meshing engagement with said driving friction clutch element and being adapted to meshingly engage the teeth on the driven jaw clutch element as the driving gear is axially moved between said engaged and disengaged positions; and said driving gear being adapted to contact an abutment surface formed on said driving friction clutch element when said driving gear is in its disengaged position whereby further axial movement of said driving gear away from said driven jaw clutch element causes axial movement of said driving friction clutch element in opposition to said resilient means so as to move same to the disengaged position.

5. A structure according to claim 4, wherein said first sleeve means includes a first sleeve member nonrotatably mounted on said driving shaft for slideable axial movement relative thereto and a second sleeve member concentric with said first sleeve member and mounted for axial movement relative to said housing means and relative to said driving shaft, and said second sleeve member having a pair of diametrically opposite elongated slots formed therein; and said eccentric crank including an eccentric pin rotatably supported in said housing with said pin extending through said slots and preventing rotation of said second sleeve member, said pin being angularly movable between two extreme positions which in turn causes said first sleeve means to be axially moved between two extreme positions which represent the engaged and disengaged positions of the friction and positive clutch means.

6. A structure according to claim 5, wherein said second sleeve means includes notch means formed in one axial end thereof with said eccentric pin being adapted to be positioned within said notch means when said pin is positioned within one of its two extreme positions, said resilient means urging said second sleeve means in a direction toward said eccentric pin so as to maintain same adjacent the bottom of said notch means whenever said pin is in one of its two extreme positions.